(12) United States Patent
Li et al.

(10) Patent No.: US 8,839,259 B2
(45) Date of Patent: *Sep. 16, 2014

(54) THREAD SCHEDULING ON MULTIPROCESSOR SYSTEMS

(75) Inventors: Wenlong Li, Beijing (CN); Tao Wang, Beijing (CN); Aamer Jaleel, Hudson, MA (US); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/355,611

(22) Filed: Jan. 23, 2012

(65) Prior Publication Data

US 2012/0124587 A1    May 17, 2012

Related U.S. Application Data

(63) Continuation of application No. 11/728,350, filed on Mar. 26, 2007, now Pat. No. 8,132,172.

(51) Int. Cl.
*G06F 9/46* (2006.01)
*G06F 9/38* (2006.01)
*G06F 9/50* (2006.01)

(52) U.S. Cl.
CPC ............ *G06F 9/5044* (2013.01); *G06F 9/3885* (2013.01); *G06F 9/3836* (2013.01); *G06F 9/3891* (2013.01); *G06F 9/3851* (2013.01)
USPC .......................................... 718/104; 718/102

(58) Field of Classification Search
None
See application file for complete search history.

(56) References Cited

U.S. PATENT DOCUMENTS

| | | | |
|---|---|---|---|
| 7,680,495 | B2 | 3/2010 | Abed et al. |
| 8,010,337 | B2 | 8/2011 | Narayanan et al. |
| 8,132,172 | B2 * | 3/2012 | Li et al. ............ 718/102 |
| 2003/0233394 | A1 * | 12/2003 | Rudd et al. ............ 709/107 |
| 2006/0149994 | A1 * | 7/2006 | Kurapati et al. .......... 714/4 |
| 2008/0155197 | A1 | 6/2008 | Li et al. |
| 2008/0259803 | A1 | 10/2008 | Elliot et al. |

OTHER PUBLICATIONS

Iyer, Ravi, "CQoS: A Framework for Enabling QoS in Shared Caches of CMP Platforms", Jun. 26-Jul. 1, 2004, ACM, pp. 257-266.*
Thitikamol et al. "Thread Migration and Load Balancing in Non-Dedicated Environments," 2000 IEEE (6 pages).

* cited by examiner

*Primary Examiner* — Kenneth Tang
(74) *Attorney, Agent, or Firm* — Trop, Pruner & Hu, P.C.

(57) ABSTRACT

A thread scheduler may be used in a chip multiprocessor or symmetric multiprocessor system to schedule threads to processors. The scheduler may determine the bandwidth utilization of the two threads in combination and whether that utilization exceeds the threshold value. If so, the threads may be scheduled on different processor clusters that do not have the same paths between the common memory and the processors. If not, then the threads may be allocated on the same processor cluster that shares cache among processors.

7 Claims, 2 Drawing Sheets

THREAD SCHEDULING ON MULTIPROCESSOR SYSTEMS

CROSS-REFERENCE TO RELATED APPLICATION

This application is a continuation of U.S. patent application Ser. No. 11/728,350, filed Mar. 26, 2007 now U.S. Pat. No. 8,132,172.

BACKGROUND

This relates generally to multithreaded applications or multiprocessor systems and, more specifically, to thread scheduling on a multiprocessor system.

A threaded application usually has shared data among its threads when running on symmetric multiprocessors (SMP) and/or chip multiprocessors (CMP). In symmetric processing, a computer architecture provides fast performance by making multiple processors available to complete individual processes simultaneously. Any idle processor can be assigned any task and additional processors can be added to improve performance in handling increased loads. A chip multiprocessor includes multiple processor cores on a single chip, allowing more than one thread to be active at a time on a chip. A CMP is SMP implemented on a single integrated circuit. Thread level parallelism is parallelism inherent in an application that runs multiple threads at once.

The data sharing among different threads may be achieved in different ways, but frequently is done through a shared system level memory. In a typical memory hierarchy in a multiprocessor system, a system level memory shared between different processing cores has longer access latency for a processing core than a local cache of the processing core. Additionally, traffic among different processing cores generated by excessive access to a shared system level memory may saturate the bandwidth of a system interconnect.

DETAILED DESCRIPTION

Figure 1:
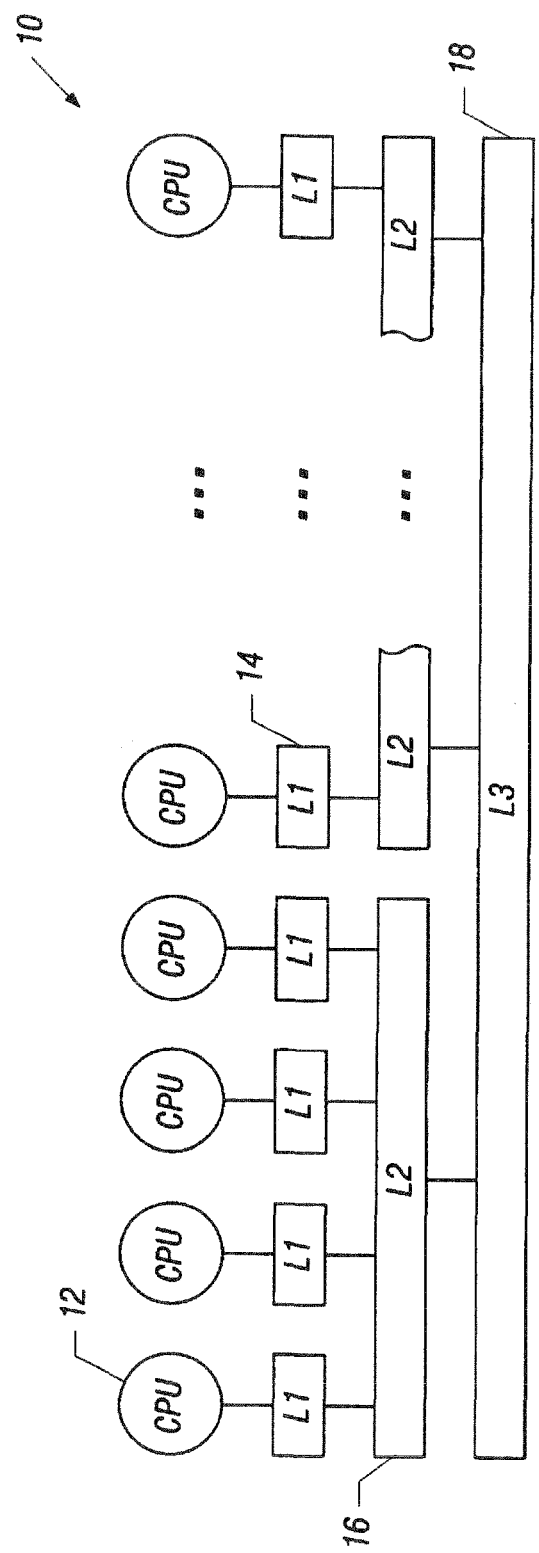
FIG. 1 is block diagram of an example of the multiprocessor system that uses data sharing aware thread scheduling according to one embodiment.

FIG. 1 shows an example SMP system 100. The system 100 includes the plurality of processors 110 and a shared memory hierarchy 120. The memory hierarchy 120 may include a first level cache 130 associated with each processor 110, a second level, cache 140 that is shared and is associated with a group of processors 110, and a completely shared memory 150. The first level caches 130 may be coupled to the shared caches 140 and the shared caches 140 may be coupled to the memory 150 via a bus or a ring or other interconnects. The processors 110 may be used to execute instructions that effectively perform the software routines that are executed by the computing system 100. The processors 110 can be used to run multithreaded applications where different processors 110 are running different threads. The SMP system may be implemented on a single integrated circuit in which each processor has a separate core on the integrated circuit and in which case the CMP system is also a SMP system.

Parallel programming languages, such as OpenMP, TBB and CILK, may be used for writing multithreaded applications. The tasks to be performed in multithreaded applications may assign different tasks to different processors 110. Data that is used by multiprocessors 110 is shared by the shared memory 150. Utilizing the shared memory 150 may result in long latency memory access and high bus bandwidth.

Figure 2:
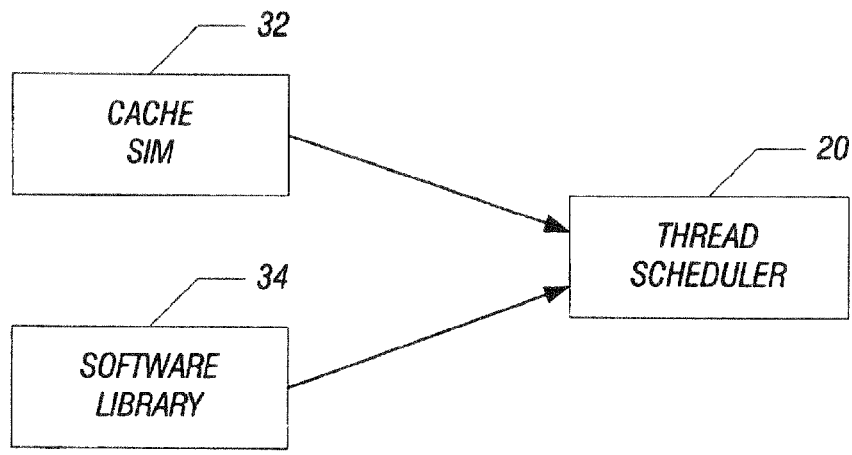
FIG. 2 is a block diagram of a data sharing thread scheduler according to one embodiment.

In accordance with one embodiment shown in FIG. 2, a cache simulator 32 models the SMP/CMP cache architecture and collects data sharing behavior from multithreaded workloads. A software library 34 measures the interconnect bandwidth utilization of each thread by invoking tools when running multithreaded workloads on an SMP or CMP machine. A hierarchical thread scheduler 20 receives, as inputs, a coupling degree matrix and interconnection bandwidth utilization for thread allocation on SMP or CMP systems.

Sharing of the middle level cache 140 or the lower level cache 150 is popular in multi-core processors. The effectiveness of such a design is affected by the amount and type of data sharing exhibited in important multithreaded workloads. For workloads with high data sharing behavior, sharing cache is a promising way of optimizing data locality to achieve good cache performance and, thus, may bring absolute performance gains in execution time.

A cache simulator 32 may be developed to monitor the data sharing footprint. A coupling degree matrix may be developed from a shared data footprint between threads using a cache simulator. The coupling degree $T_{i,j}$ between a thread i and a thread j in terms of the shared data footprint measured as the total amount of accesses from these two threads to cache lines shared between the two threads. Similarly, the coupling degree can be obtained between any three threads, four threads, etc. that can be measured in the simulator.

By developing the coupling degree matrix that relates the coupling between each pair of different threads, the relationship between the threads, including how tightly or loosely coupled they may be, may be determined. Then the scheduler 20 can allocate them among processors or cores of a cluster to utilize the shared cache to preserve data locality to achieve high parallel efficiency.

In an SMP or CMP machine, multiprocessors or cores share one interconnect, such as a bus, so this interconnect resource is precious and its utilization affects the final scalability performance. On a cluster organized as an SMP or CMP machine, there are multiple interconnects available. For threads with high demands on the interconnect bandwidth, placing them on different clusters to utilize the dedicated bused resources would improve overall performance. A software library 34 that monitors performance counters can obtain information about the bandwidth utilization.

As the coupling degree matrix indicates the data locality information between threads and the bandwidth utilization vector shows the bandwidth demand, the scheduler considers these matrices to guide thread allocation for purposes of high performance. Since there is a correlation between cache miss and bandwidth demand, the coupling degree matrix has no obvious impact on cache performance in terms of cache miss. Therefore, bandwidth utilization may be treated as the highest priority in determining schedule and then data locality, such as the coupling degree matrix, may be considered in case bandwidth contention is not a problem. If the bandwidth utilization of co-scheduled threads on one cluster exceeds a threshold, for example 15 percent, then the performance is not as good as in the case of scheduling them on different clusters. Conversely, if bandwidth competition is not significant (less than the threshold), then scheduling closely coupled threads on one cluster would be promising to achieve higher performance.

Figure 3:
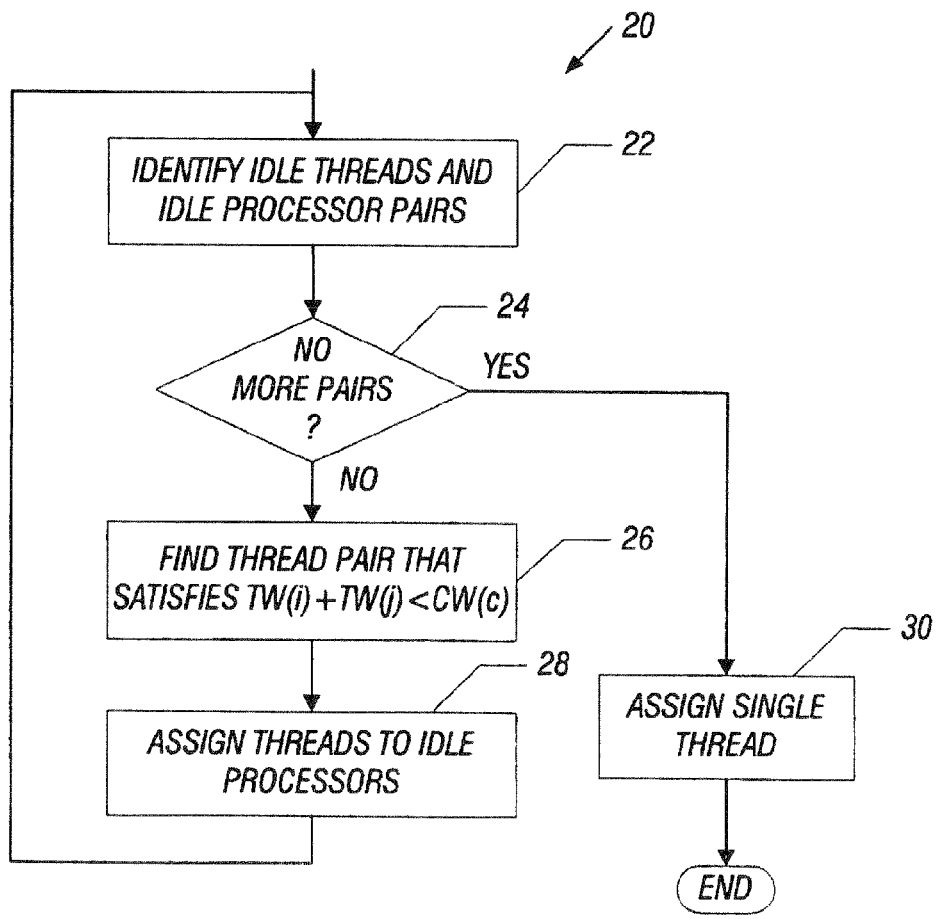
FIG. 3 is a flow chart for scheduling threads to target processors in accordance with one embodiment.

Referring to FIG. 3, the sequence followed by the scheduler 20 is illustrated. Initially, idle threads and idle process pairs are identified at block 22. A check at diamond 24 determines whether there are any more pairs. If not, the thread pair that satisfies TW(i)+TW(j)<CW(c) and maximum value of M(i,j) is chosen (block 26). TW stands for the thread bandwidth and CW stands for the cluster bandwidth. M is the coupling degree matrix.

Next, the threads are assigned to idle processes, as indicated in block 28. If there are no more pairs, the single thread may be assigned as indicated in block 30. The flow iterates until all the pairs have been assigned.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory computer readable medium storing instructions that enable a computer system to:
   determine bandwidth utilization of two threads using a software library;
   assign two threads to processors based on bandwidth utilization of the two threads in combination;
   determine whether the bandwidth utilization of the two combined threads exceeds a threshold value;
   use a cache simulator to measure coupling between the two threads in terms of the number of accesses to cache lines shared between the two threads; and
   store a coupling degree matrix by rating two threads in terms of the total amount of accesses to cache lines shared between two threads.

2. The medium of claim 1 further storing instructions to determine if the bandwidth utilization exceeds a threshold of fifteen percent.

3. A system comprising:
   a plurality of processors;
   a plurality of memories specific to each of said processors;
   a common memory used by more than one of said processors;
   use a cache simulator to measure coupling between the two threads in terms of the number of accesses to cache lines shared between the two threads and rate two threads in terms of the total amount of accesses to cache lines shared between two threads; and
   a thread scheduler to determine the bandwidth utilization of two threads in combination using a software library.

4. The system of claim 3 wherein each of said clusters includes a different path to said common memory.

5. The system of claim 3 wherein said scheduler to determine the coupling degree matrix by rating the threads in terms of the total amount of accesses to cache lines in said common memory.

6. A method comprising:
   determining bandwidth utilization of two threads using a software library;
   assigning two threads to processors based on bandwidth utilization of the two threads in combination;
   determining whether the bandwidth utilization of the two combined threads exceeds a threshold value;
   using a cache simulator to measure coupling between the two threads in terms of the number of accesses to cache lines shared between the two threads; and
   rating two threads in terms of the total amount of accesses to cache lines shared between two threads.

7. The method of claim 6 including determining if the bandwidth utilization exceeds a threshold of fifteen percent.

* * * * *